US010263561B2

(12) United States Patent
Huh et al.

(10) Patent No.: US 10,263,561 B2
(45) Date of Patent: Apr. 16, 2019

(54) BACKSPIN MANAGEMENT FOR ELECTRIC SUBMERSIBLE PUMP

(71) Applicant: General Electric Company, Schenectady, NY (US)

(72) Inventors: Kum Kang Huh, Schenectady, NY (US); David Allan Torrey, Ballston Spa, NY (US); Di Pan, Schenectady, NY (US); Nathaniel Benedict Hawes, Ballston Spa, NY (US); Tomas Sadilek, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 210 days.

(21) Appl. No.: 15/282,399

(22) Filed: Sep. 30, 2016

(65) Prior Publication Data

US 2018/0097466 A1 Apr. 5, 2018

(51) Int. Cl.
*H02K 5/132* (2006.01)
*H02K 11/26* (2016.01)
*H02P 29/028* (2016.01)
*F04D 29/42* (2006.01)
*F04D 13/08* (2006.01)
*F04D 13/10* (2006.01)
*F04D 15/00* (2006.01)
*F04D 29/22* (2006.01)
*E21B 43/12* (2006.01)

(52) U.S. Cl.
CPC .......... *H02P 29/028* (2013.01); *E21B 43/128* (2013.01); *F04D 13/086* (2013.01); *F04D 13/10* (2013.01); *F04D 15/0088* (2013.01); *F04D 29/22* (2013.01); *F04D 29/426* (2013.01); *H02K 5/132* (2013.01); *H02K 11/26* (2016.01)

(58) Field of Classification Search
CPC ...................................................... H02P 29/028
USPC ......................................................... 318/3, 34
See application file for complete search history.

(56) References Cited

U.S. PATENT DOCUMENTS 4,330,740 A 5/1982 Shell et al.
4,410,845 A * 10/1983 Lockyear .............. E21B 43/128
                                                                        318/368

(Continued)

FOREIGN PATENT DOCUMENTS

WO 2014/209127 A1 12/2014

OTHER PUBLICATIONS

Ernst, T., "Application of Multi-function Motor Protection Relays to Variable Frequency Drive Connected Motors," 67th Annual Conference for Protective Relay Engineers, pp. 279-291 (2014).

(Continued)

*Primary Examiner* — David Luo
(74) *Attorney, Agent, or Firm* — GE Global Patent Operation

(57) ABSTRACT

A method of controlling an electric motor assembly includes detecting a backspin event of an electric motor, and managing a response to the detected backspin event of the electric motor. The backspin event of the electric motor is detected based at least in part on feedback from a sensor configured to measure a current or a voltage on a cable coupled to the electric motor. The response includes communicating an alert to personnel, controlling the voltage on the cable to be less than a voltage threshold, or any combination thereof.

20 Claims, 6 Drawing Sheets

(56) References Cited

U.S. PATENT DOCUMENTS

| | | | |
|---|---|---|---|
| 5,198,734 | A | 3/1993 | Johnson |
| 6,113,355 | A | 9/2000 | Hult et al. |
| 6,264,431 | B1 | 7/2001 | Triezenberg |
| 6,369,534 | B1 | 4/2002 | Menegoli |
| 6,388,353 | B1 | 5/2002 | Liu et al. |
| 6,798,338 | B1 * | 9/2004 | Layton ............ E21B 43/128 166/302 |
| 6,940,249 | B2 | 9/2005 | Toyoda |
| 7,170,262 | B2 | 1/2007 | Pettigrew |
| 7,202,619 | B1 | 4/2007 | Fisher |
| 7,330,779 | B2 | 2/2008 | Schulz |
| 7,479,756 | B2 * | 1/2009 | Kasunich ......... H02H 7/1216 318/731 |
| 7,971,650 | B2 | 7/2011 | Yuratich et al. |
| 8,334,666 | B2 * | 12/2012 | Plitt ................ H02P 3/00 318/255 |
| 8,456,116 | B2 | 6/2013 | Burdick |
| 8,624,530 | B2 | 1/2014 | Chung et al. |
| 9,054,615 | B2 | 6/2015 | Head et al. |
| 9,057,256 | B2 | 6/2015 | Ige et al. |
| 9,595,903 | B2 | 3/2017 | Hawes et al. |
| 9,903,373 | B2 | 2/2018 | Hawes et al. |
| 2008/0187444 | A1 | 8/2008 | Molotkov et al. |
| 2011/0033314 | A1 | 2/2011 | Plitt et al. |
| 2013/0235494 | A1 | 9/2013 | Holce et al. |
| 2018/0094512 | A1 | 4/2018 | Sadilek et al. |

OTHER PUBLICATIONS

Hawes, N. B., et al., Integrated Monitoring of an Electric Motor Assembly, GE Co-Pending U.S. Appl. No. 15/442,068, filed Feb. 24, 2017.

Huh, K., et al., Systems and Methods for Active Damping of a Motor, GE Co-Pending U.S. Appl. No. 15/634,723, filed Jun. 27, 2017.

International Search Report and Written Opinion issued in connection with corresponding PCT Application No. PCT/US2017/054207 dated Jan. 22, 2018.

Ernst, Terry, et al.; "Back Spin Control in Progressive Cavity Pump for Oil Well", 2006 IEEE/PES Transmission & Distribution Conference and Exposition: Latin America, pp. 1-7, Aug. 15-18, 2006, Caracas.

Rabbi, S.F., et al.; "Equivalent Circuit Modeling of a Hysteresis Interior Permanent Magnet Motor for Electric Submersible Pumps.", IEEE Transactions on Magnetics, vol. PP, Issue: 99, pp. 1, Feb. 3, 2016.

\* cited by examiner

BACKSPIN MANAGEMENT FOR ELECTRIC SUBMERSIBLE PUMP

BACKGROUND

The subject matter disclosed herein relates to the management of backspin for an electric submersible pump (ESP), and more specifically to the management of backspin for an ESP in oil and gas applications with an electric motor.

In typical oil and gas drilling applications a well bore is drilled to reach a reservoir. The well bore may include multiple changes in direction and may have sections that are vertical, slanted, or horizontal. A well bore casing is inserted into the well bore to provide structure and support for the well bore. The oil, gas, or other fluid deposit is then pumped out of the reservoir, through the well bore casing, and to the surface, where it is collected. One way to pump the fluid from the reservoir to the surface is with an electrical submersible pump (ESP), which is driven by an electric motor (e.g., a permanent magnet motor, induction motor) in the well bore casing. Typically, a power source at the surface provides power to the electric motor via a cable. A magnetic field associated with a permanent magnet motor remains even when the permanent magnet motor is not actively driven. Additionally, some circumstances, such as a descending fluid column relative to or through the ESP, can lead to generation of voltage on the cable that otherwise provides power to the electric motor. This is referred to in the industry as motor backspin. Motor backspin may occur with induction motors, or more commonly with permanent magnet motors. By way of Faraday's law of induction, backspin of the permanent magnet motor may generate a voltage on the cable even when the permanent magnet motor is not actively driven.

BRIEF DESCRIPTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, a method of controlling an electric motor assembly includes detecting a backspin event of an electric motor, and managing a response to the detected backspin event of the electric motor. The backspin event of the electric motor is detected based at least in part on feedback from a sensor configured to measure a current or a voltage on a cable coupled to the electric motor. The response includes communicating an alert to personnel, controlling the voltage on the cable to be less than a voltage threshold, or any combination thereof.

In another embodiment, an electric submersible pump (ESP) control system includes one or more sensors coupled to a cable and a controller coupled to the one or more sensors. The one or more sensors are configured to measure a voltage or a current of the cable, which is configured to electrically couple the ESP control system to a permanent magnet motor. The controller is configured to detect a backspin event of the permanent magnet motor based at least in part on the measured voltage or current of the cable, and the controller is configured to manage a response to the detected backspin event. The response includes a communication to alert personnel, a first action to control the voltage on the cable to be less than a voltage threshold, a second action to restrict access to the cable, or any combination thereof.

In another embodiment, a non-transitory computer readable media includes instructions to be executed by a processor of an electric submersible pump (ESP) control system. The instructions include instructions to detect a backspin event of an electric motor based at least in part on feedback from a sensor configured to measure a current or a voltage on a cable coupled to the electric motor, and instructions to manage a response to the detected backspin event of the electric motor. The response includes communicating an alert to personnel, controlling the voltage on the cable to be less than a voltage threshold, or any combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
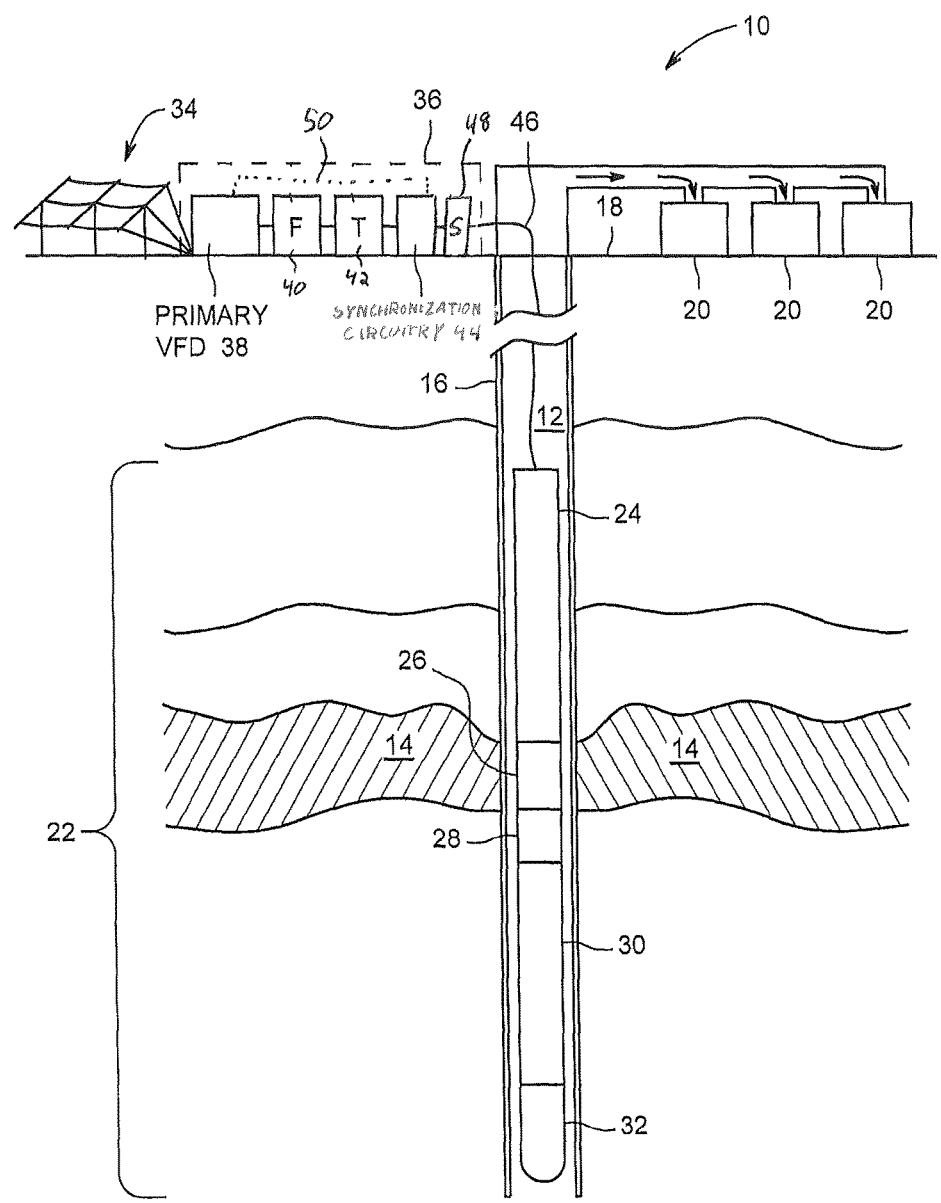
FIG. 1 is a schematic of a hydrocarbon extraction system extracting fluid from an underground reservoir in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Electric motor systems may be used to drive various loads, such as submersible pumps for oil and gas applications. Permanent magnet electric motors may be more efficient and have a greater power density than induction electric motors. The magnetic field associated with a permanent magnet motor remains even when the permanent magnet motor is not actively driven. Accordingly, relative motion between the magnetic field and the stator coils within the permanent magnet motor may generate a voltage on the cable that provides power to the permanent magnet motor. At the moment of shutdown of an electric submersible pump (ESP) assembly with a permanent magnet motor, a potentially large column of fluid (e.g., oil) may be above the ESP assembly. As the fluid drains through the ESP assembly, the permanent magnet motor may backspin, thereby generating a voltage on the cable. Additionally, during installation or removal of the ESP assembly, fluid movement within the well bore may move relative to elements of the ESP assembly and cause backspin of the permanent magnet motor. In some situations, the fluid through the ESP assembly may generate a voltage on the cable for a sustained period of time (e.g., 15 seconds, 1 minute, 5 minutes, or 15 minutes or more). Systems and methods described herein may reduce or eliminate the voltage on the cable near the surface, thereby reducing a shock risk for personnel at the surface. Additionally, or in the alternative, systems and methods described herein may provide alerts to the presence of the voltage on the cable or restrict the accessibility of the cable at least during such sustained periods of time.

It will be appreciated that in some circumstances (e.g., backspin), an induction motor of the ESP assembly may generate a voltage on the cable. Accordingly, it will be appreciated that the systems and methods described herein for permanent magnet motors may also be applied to induction motors.

Turning to the drawings, FIG. 1 is a schematic of a hydrocarbon extraction system (e.g., well 10) extracting fluid deposits (e.g., oil, gas, etc.) from an underground reservoir 14. As shown in FIG. 1, a well bore 12 may be drilled in the ground toward a fluid reservoir 14. Though the well bore 12 shown in FIG. 1 is a vertical well bore 12, well bores 12 may include several changes in direction and may include slanted or horizontal sections. A well bore casing 16 is typically inserted into the well bore 12 to provide support. Fluid deposits from the reservoir 14, may then be pumped to the surface 18 for collection in tanks 20, separation, transportation, and refining. Though there are many possible ways to pump fluids from an underground reservoir 14 to the surface 18, one technique is to use an electrical submersible pump (ESP), as shown in FIG. 1.

When using an ESP, an ESP assembly or system 22 is fed through the well bore casing 16 toward the reservoir 14. The ESP assembly 22 may include a pump 24, an intake 26, a sealing assembly 28, an electric motor 30, and a sensor 32. Power may be drawn from a power source 34 and provided to the electric motor 30 by an ESP control system 36. The power source 34 shown in FIG. 1 is a utility grid, but power may be provided in other ways (e.g., generator, batteries, etc.). The ESP control system 36 may include a primary variable frequency drive (VFD) 38, a filter 40, a transformer 42, synchronization circuitry 44, and a cable 46. In some embodiments, one or more sensors 48 are coupled to the cable 46 to measure one or more electrical properties (e.g., voltage, current, inductance, capacitance, impedance) of the variable frequency power signal on the cable 46. The one or more sensors 48 may also measure a voltage on the cable 46 caused by a backspin of the motor 30. It should be understood, that while FIG. 1 shows one embodiment, and other embodiments may omit some elements or have additional elements. The primary VFD 38 receives power from the power source 34 and synthesizes the variable frequency, variable amplitude, AC voltage that drives the motor. In some embodiments, the power output by the primary VFD 38 may be filtered by filter 40. In the present embodiment, the filter 40 is a sine wave filter. However, in other embodiments, the filter may be a low pass filter, a band pass filter, or some other kind of filter. The power may then be stepped up or down by a transformer 42. In the present embodiment, a step up transformer is used for efficient transmission down the well bore 12 to the ESP assembly 22, however, other transformers or a plurality of transformers may be used. The ESP control system 36 provides power to the motor 30 via the cable 46 to drive the pump 24. As discussed herein, the motor 30 is a permanent magnet motor.

The permanent magnet motor 30 may more efficiently convert the variable frequency power signal from the cable 46 to mechanical energy when the rotor position of the motor 30 is synchronized with the phase angle of the current provided to the stator of the motor 30. As discussed in detail below, the synchronization circuitry 44 may directly adjust the phase angle of the current provided via the cable 46 to the motor 30 or indirectly adjust the phase angle of the current provided via the cable through control of the primary VFD 38. In some embodiments, the synchronization circuitry 44 includes a secondary VFD disposed on the high-voltage side of the transformer 42 and configured to deliver full-rated current for a short period of time (e.g., one minute or less) when the electric motor 30 draws more power than the transformer 42 can support for the short period of time. In embodiments with multiple transformers (e.g., a step up transformer 42 at the surface, and a step down transformer in the well bore 12, at the end of the cable 46), the secondary VFD of the synchronization circuitry 44 may be installed between the transformers or at the termination of the second transformer.

In some embodiments, the synchronization circuitry 44 includes a controller configured to provide adjustment signals to the primary VFD 38 via a transmission link 50 to adjust the power output provided by the primary VFD 38 to the transformer 42. As discussed herein, the controller that provides adjustment signals to the primary VFD 38 may be configured as a "virtual encoder" for the primary VFD 38. Suitable transmission links 50 may include wired or wireless connections, and the adjustment signals may be analog adjustment signals or digital adjustment signals.

During operation of the ESP assembly 22, a variable frequency power signal output is provided to the ESP assembly 22 via the cable 46 that is fed through the well bore casing 16 from the surface 18 to the ESP assembly 22. The pump 24 may be a centrifugal pump with one or more stages. The intake 26 acts as a suction manifold, through which fluids 14 enter before proceeding to the pump 24. In some embodiments, the intake 26 may include a gas separator. A sealing assembly 28 may be disposed between the intake 26 and the motor 30. The sealing assembly protects the motor 30 from well fluids 14, transmits torque from the motor 30 to the pump 24, absorbs shaft thrust, and equalizes the pressure between the reservoir 14 and the motor 30. Additionally, the sealing assembly 28 may provide a chamber for the expansion and contraction of the motor oil resulting from the heating and cooling of the motor 30 during operation. The sealing assembly 28 may include labyrinth chambers, bag chambers, mechanical seals, or some combination thereof.

The sensor 32 is typically disposed at the base of the ESP assembly 22 and collects real-time system and well bore parameters. Sensed parameters may include pressure, temperature, motor winding temperature, vibration, current leakage, discharge pressure, and so forth. The sensor 32 may provide feedback to the ESP control system 36 and alert users when one or sensed parameters fall outside of expected ranges.

Figure 2:
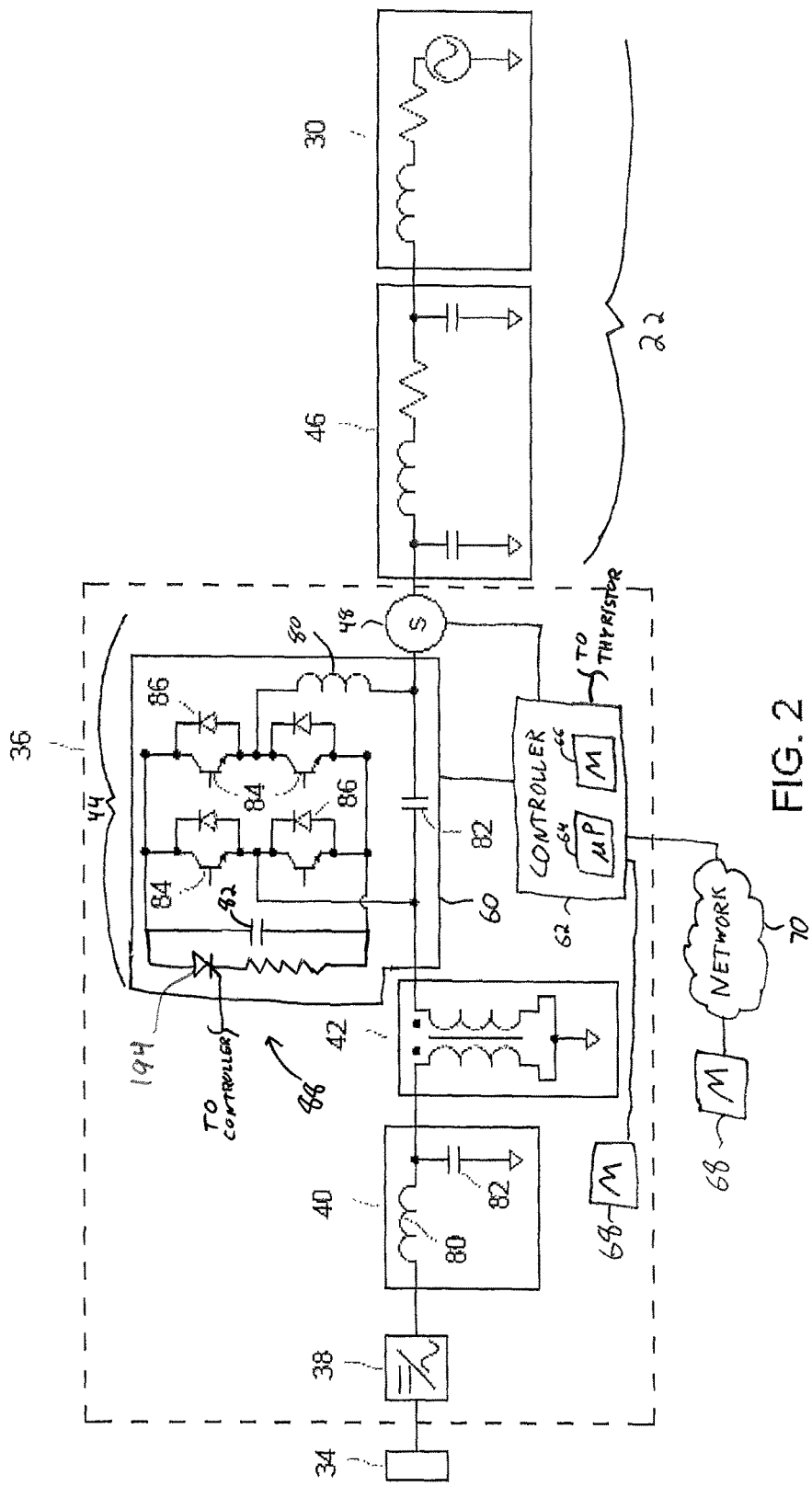
FIG. 2 is a wiring schematic of the electric submersible pump (ESP) control system with a secondary variable frequency drive in accordance with aspects of the present disclosure.

FIG. 2 is a wiring schematic of an embodiment of the ESP control system 36 shown in FIG. 1, where the synchronization circuitry 44 includes a secondary VFD 60. In some embodiments, the secondary VFD 60 is coupled to a controller 62 configured to control the output of the secondary VFD 60 to the cable 46. The controller 62 may include a processor 64 configured to execute instructions from a memory 66 (e.g., a non-transitory, computer readable media). As previously discussed, the primary VFD 38 receives power from a power source 34 (e.g., utility grid, battery, generator, etc.), modifies the power, and outputs a power signal of the desired frequency and amplitude for driving the electric motor 30. The primary VFD 38 may include power electronic switches, current measurement components, voltage measurements components, a processor, or other components. The primary VFD 38 is disposed on the primary side (e.g., low voltage side) of the transformer 42 and is programmed to operate the motor 30 (e.g., permanent magnet motor).

The variable frequency output signal from the primary VFD 38 may then be filtered using the filter 40. In the embodiment shown, the filter 40 is a sine wave filter, however in other embodiments, the filter may be any low pass filter, or any other kind of filter. As shown in FIG. 2, the filter 40 may include inductors 80, capacitors 82, or other electrical components. The output from the filter 40 is stepped up using the step up transformer 42. The step up transformer steps up the voltage of the power signal for efficient transmission through the cable 46 to the electric motor 30, which in some applications may be as long as 1,000 to 10,000 feet. Magnetic saturation of the transformer 42 for some loading conditions (e.g., startup of a synchronous motor, seizure of the pump, transient load conditions, etc.) with a low frequency and a high torque may prevent the primary VFD 38 and the transformer 42 alone from providing sufficient voltage or magnetic flux to keep the electric motor 30 from stalling.

In order to deal with the magnetic saturation potential of the transformer 42, the synchronization circuitry 44 may include the secondary VFD 60 disposed in series or parallel with the cable 46, on the high voltage secondary side of the transformer 42. The secondary VFD 60 may be configured to deliver full rated current to the motor 30 for short periods of time (e.g., less than 1 minute). Because the secondary VFD 60 is on the high voltage side of the transformer 42, the secondary VFD 60 can provide full rated current for a short period of time (e.g., one minute or less), thus supplementing the voltage of the primary VFD 38 until the motor 30 reaches a high enough frequency for the primary VFD 38 to drive the motor 30 on its own. As previously discussed, the variable frequency power signal output by the ESP control system 36 is transmitted to the electric motor 30 via the cable 46.

The elements of the synchronization circuitry 44 may be utilized to enable the ESP control system 36 to transmit desired power (e.g., desired frequency, desired voltage, desired current, desired angle) along the cable 46 to the ESP assembly 22. The secondary VFD 60 may interface with only one or all three phases of the system 36. As shown in FIG. 2, the secondary VFD 60 may include transistors 84 (e.g., IGBT or MOSFET), diodes 86, inductors 80, capacitors 82, and any number of other components. The synchronization circuitry 44 may also include power electronic switches, one or more sensors 48 to measure electrical properties on the cable 46 (e.g., current, voltage, impedance, capacitance, inductance), the controller 62 coupled to the one or more sensors 48, the processor 64, the memory 66, and the like. In some embodiments, the controller 62 may utilize feedback from the one or more sensors 48 and algorithms stored in the memory 66 to detect a backspin of the motor 30. As discussed in detail below, upon detection of the backspin, the controller 62 may reduce or eliminate the voltage on the cable 46 caused by backspin of the motor 30. Additionally, or in the alternative the controller 62 may be configured to mitigate hazards of the voltage on the cable 46 through alerts or controlling restrictions on access to the cable 46 at least while the backspin-induced voltage is present on the cable 46. The synchronization circuitry 44 may include a crowbar circuit, a clamp circuit, a dynamic brake circuit 88, or any combination thereof. As discussed in detail below, the crowbar circuit, the clamp circuit, or the dynamic brake circuit 88 may facilitate dissipation of energy generated by backspin of the motor 30. Furthermore, in addition to the single phase H-bridge topology shown in FIG. 2, the secondary VFD 60 may have a single phase half-bridge topology, or a polyphase half-bridge topology. In addition to the series topology, a parallel topology may be employed to couple the secondary VFD 60 to the output of the transformer 42.

The algorithms executed by the controller 62 for methods related to backspin-induced voltage reduction or mitigation may utilize feedback provided by the one or more sensors 48 and data stored in a data storage device 68. The data stored in the data storage device 68 may include reference data, one or more thresholds, a lookup table, data from the coupled hydrocarbon extraction system 10, or data from other hydrocarbon extraction systems 10, or any combination thereof. The data storage device 68 may be the memory 66 of the controller 62, a memory of the ESP control system 36, or a memory coupled to the controller 62 via a network 70.

Figure 3:
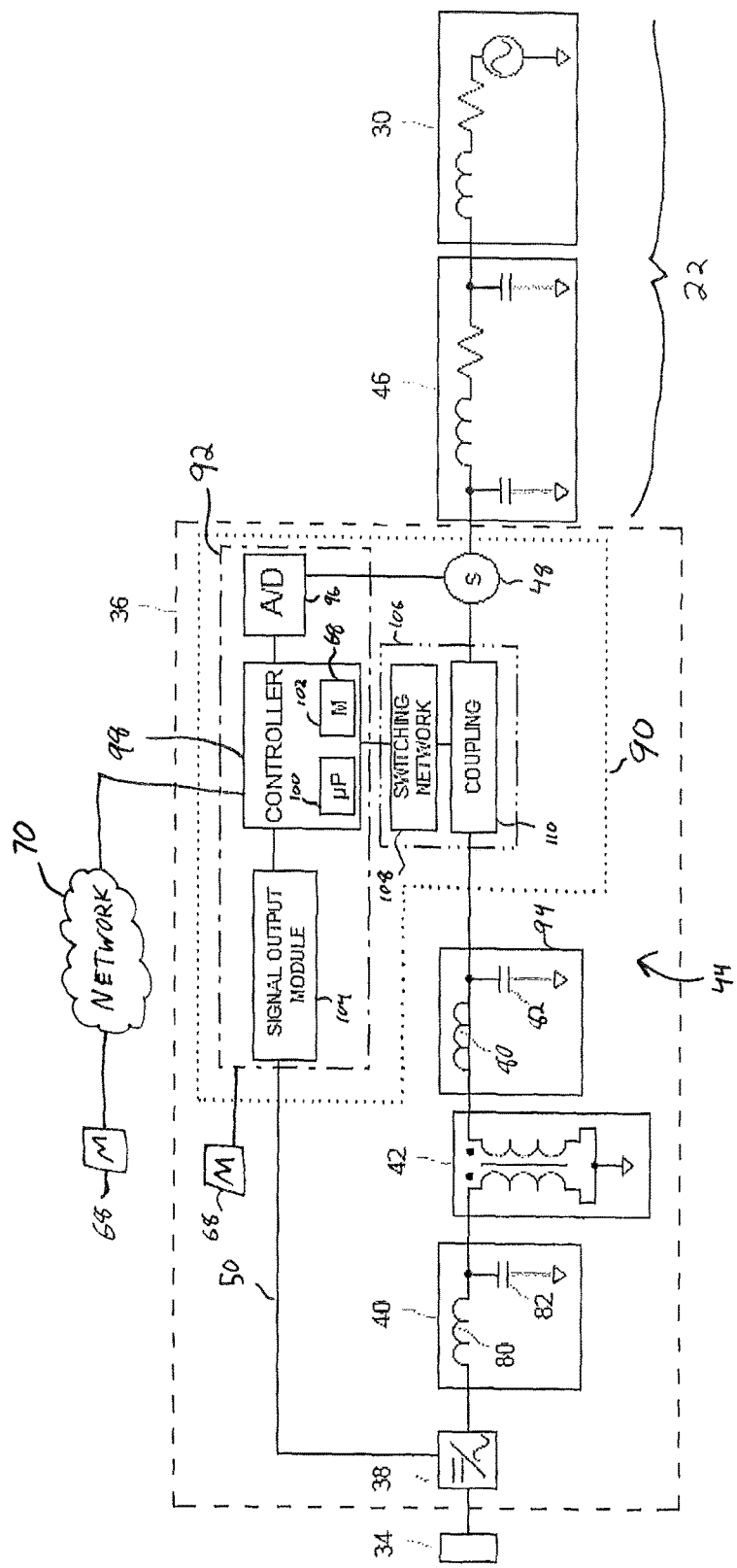
FIG. 3 is a wiring schematic of the ESP control system with a virtual encoder in accordance with aspects of the present disclosure.

FIG. 3 is a wiring schematic of an embodiment of the ESP control system 36 shown in FIG. 1, where the synchronization circuitry 44 includes a virtual encoder 90. As previously discussed, the primary VFD 38 receives power from a power source 34 (e.g., utility grid, battery, generator, etc.), modifies the power, and outputs a power signal of the desired frequency and amplitude for driving the electric motor 30. The primary VFD 38 may include power electronic switches, current measurement components, voltage measurements components, a process, or other components. The primary VFD 38 is disposed on the primary side of the transformer 42 and is programmed to operate the motor 30.

One or more sensors 48 of the virtual encoder 90 of the synchronization circuitry 44 may measure electrical properties on the cable 46 (e.g., current, voltage, impedance, capacitance, inductance, back-electromotive force). The measured electrical properties on the cable 46 may include, but are not limited to signals generated by the primary VFD 38 or the motor 30. In some embodiments, the one or more sensors 48 may provide feedback to a digital signal processor 92, which correlates the feedback with a rotor position of the motor 30. The digital signal processor 92 may transmit signals corresponding to the rotor position to the primary VFD 38 via the transmission link 50. The signals transmitted to the primary VFD 38 may adjust one or more properties of the output of the primary VFD 38 including, but not limited to the frequency, the angle, the current, or the voltage, or any combination thereof. The primary VFD 38 may be configured to respond to signals from the digital signal processor 92 as though the signals were from a closed-loop position sensor disposed within the motor 30 itself.

A signal injection module 106 of the virtual encoder 90 may introduce signals (e.g., diagnostic signals, measurement signals) to the cable 46. After introduction of the signals to the cable 46, the one or more sensors 48 measure the effect on the cable 46 and the ESP assembly 22. The feedback from the one or more sensors 48 may be utilized to determine the rotor position at low or zero rotor speeds of the motor 30. A filter 94 (e.g., low pass filter, high pass filter, bandstop filter) may reduce or eliminate injected high frequency diagnostic signals from the secondary VFD 60 from passing through the transformer 42 towards the primary VFD 38 or the power source 34.

The feedback from the one or more sensors 48 may be received by an analog to digital converter 96, which converts the feedback to a digital signal to be received by a controller 98. The controller 98 may have a processor 100 configured to execute instructions stored in a memory 102. The memory 102 may be a non-transitory computer readable medium that may store instructions (e.g., code, software) for implementing an algorithm, such as an algorithm to determine the rotor position of the motor 30 from the feedback of the one or more sensors 48, to control the signal provided to the primary VFD 38 via the transmission link 50, to compare a frequency profile of the variable frequency power signal on the cable 46 to a reference, or to determine an impedance of the ESP assembly 22, or any combination thereof. In some embodiments, the controller 98 may utilize feedback from the one or more sensors 48 and algorithms stored in the memory 102 to detect a backspin of the motor 30. As discussed in detail below, upon detection of the backspin, the controller 62 may reduce or eliminate the voltage on the cable 46 caused by backspin of the motor 30. Additionally, or in the alternative the controller 98 may be configured to mitigate hazards of the voltage on the cable 46 through alerts or controlling restrictions on access to the cable 46 at least while the backspin-induced voltage is present on the cable 46. The synchronization circuitry 44 may include a crowbar circuit, which may be separate or integrated with a component (e.g., a switching network 108, a coupling 110) of a signal injection module 106. As discussed in detail below, the crowbar circuit may facilitate dissipation of energy generated by backspin of the motor 30.

The algorithms executed by the controller 98 may compare feedback provided by the one or more sensors 48 to data stored in the data storage device 68 (e.g., memory 102). As discussed above, the data stored in the data storage device 68 may include reference data, one or more thresholds, a lookup table, data from the coupled hydrocarbon extraction system 10, or data from other hydrocarbon extraction systems 10, or any combination thereof. The data storage device 68 may be the memory 102 of the controller 98, a memory of the ESP control system 36, or a memory coupled to the controller 62 via the network 70.

A signal output module 104 coupled to the controller 98 may provide one or more output signals to the primary VFD 38 via the transmission link 50. The output signals may be sinusoidal output signals, quadrature output signals, or digital output signals, or any combination thereof. The sinusoidal and quadrature output signals may contain rotor position data determined by the controller 98, which may be processed directly by the primary VFD 38 and trigger the appropriate control responses. Similarly, digital output signals may include rotor position format in a digitized format or VFD drive commands in digital format, as when the controller 98 functions as a master controller for the primary VFD 38 to control the output.

In some embodiments, the controller 98 is coupled to the cable 46 via the signal injection module 106. The signal injection module 106 may include the switching network 108 and the coupling 110. During operation of the virtual encoder 90 with the primary VFD 38, a probe signal generated by the controller 98 of the virtual encoder 90 may be transmitted via the switching network 108 to the coupling 110 for injection to the cable 46 and the motor 30 driven by the primary VFD 38. The coupling 110 may be a capacitive coupling, an inductive coupling, or any combination thereof. Moreover, the signal injection module 106 may be configured for one or more of parallel inductive signal injection, series inductive signal injection, parallel capacitive signal injection, direct series signal injection, and direct parallel signal injection individually or in combination.

As discussed above with FIGS. 2 and 3, the synchronization circuitry 44 may adjust the phase angle of the current provided via the cable 46 to the motor 30. The synchronization circuitry may directly adjust the phase angle by control of the secondary VFD 60, or the synchronization circuitry 44 may indirectly adjust the phase angle through control of the primary VFD 38 with the virtual encoder 90. As discussed herein, a dual drive system refers to embodiments of the ESP control system 36 with the primary VFD 38 and the secondary VFD 60. The dual drive system may utilize the secondary VFD 60 to supplement the primary VFD 38, for example, as described in U.S. patent application Ser. No. 14/946,513 entitled "Dual Motor Drive For Electric Submersible Pump Systems", filed Nov. 9, 2015, which is incorporated by reference in its entirety for all purposes. Moreover, as discussed herein, a virtual encoder system refers to embodiments of the ESP control system 36 with the virtual encoder 90 without the secondary VFD 60. The virtual encoder system may utilize the virtual encoder 90 to monitor the power provided to the motor 30 via the cable 46, to determine a rotor angle of the motor 30, and to control the primary VFD 38, for example, as described in U.S. patent application Ser. No. 14/663,691 entitled "Controller For Motor", filed Mar. 20, 2015, which is incorporated by reference in its entirety for all purposes. As discussed in detail below, the synchronization circuitry 44 may utilize feedback from the one or more sensors 48 of the synchronization circuitry 44 for more than adjustment of the phase angle of the current provided by the cable 46 to the motor 30.

In some embodiments, the controller 62 or 98 of the synchronization circuitry 44 may determine the rotor angle from feedback of the one or more sensors 48 based at least in part on a determined motor back-emf voltage, an injected high frequency signal, or any combination thereof. For example, the controller 62 or 98 may measure the current and voltage at the one or more sensors 48, compute the difference between an estimated current and an actual current to determine the motor back-emf voltage. The controller 62 or 98 may utilize the motor back-emf voltage to determine adjustments to the primary VFD 38 or the secondary VFD 60 that would adjust the rotor angle of the motor 30 and drive the difference between the estimated current and the actual current toward zero. To enable low speed and zero speed detection of the rotor angle, the signal injection module 106 or the secondary VFD 60 may inject a probe signal with predetermined voltage and frequency characteristics at a frequency much greater than a fundamental electrical frequency (and its low order harmonics) powering the motor 30. Accordingly, the one or more sensors 48 may measure the response (e.g., motor inductance) from the ESP assembly 22 to determine the rotor angle of the motor 30.

Figure 4:
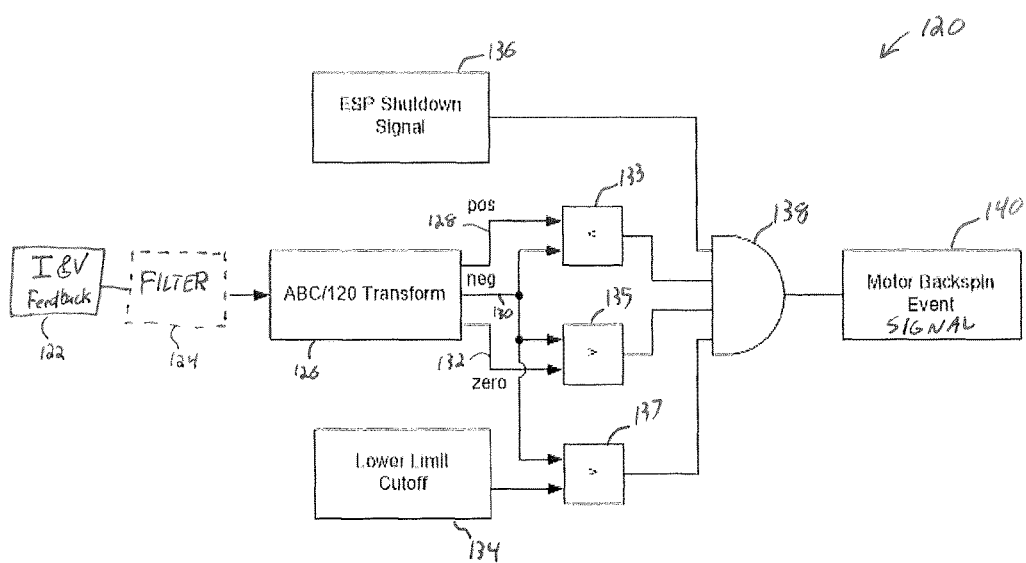
FIG. 4 is an embodiment of a control block diagram of a backspin detection algorithm in accordance with aspects of the present disclosure.

Additionally, the controller 62 or 98 may utilize the feedback from the one or more sensors 48 to detect a backspin event of the motor 30 (e.g., permanent magnet motor) and to manage a response to the backspin event when detected. FIG. 4 illustrates a control block diagram of a backspin detection algorithm 120 utilized to detect the backspin event of the ESP assembly 22. While it is understood that both the controller 62 of embodiments of the dual drive system and the controller 98 of embodiments of the virtual encoder system may execute algorithms according to the block diagram 120 to detect the backspin event, the discussion of FIG. 4 below refers to the controller 98 of the virtual encoder system for conciseness.

The controller 98 initiates the backspin detection method 120 by receiving feedback 122 from the one or more sensors 48. The feedback 122 may be current feedback measured on the cable 46, voltage feedback measured on the cable 46, or any combination thereof. In some embodiments the feedback 122 from the one or more sensors 48 may be filtered (block 124) externally via filter circuitry hardware or internally by the controller 98. A signal transformation module 126 utilizes the feedback to generate a positive component 128, a negative component 130, and a zero component 132. The positive component 128 may correspond to forward operation of the motor 30, such as when the primary VFD 38 supplies the variable frequency signal (e.g., voltage) to the motor 30 via the cable 46. The negative component 130 may correspond to backward operation of the motor 30, such as during a backspin event. The zero component 132 may correspond to a reference value, such as a ground voltage value.

The controller 98 may evaluate multiple factors to determine whether a backspin event of the motor 30 is occurring. In some embodiments, each factor may be represented by a TRUE (e.g., "1") or a FALSE (e.g., "0") value. As illustrated in FIG. 4, a first comparison 133 of the positive component 128 to the negative component 130 yields a TRUE value when the negative component 130 is less than the positive component 128, yet yields a FALSE value when the negative component 130 is not less than the positive component 128. As illustrated in FIG. 4, a second comparison 135 of the negative component 130 to the zero component 132 yields a TRUE value when the negative component 130 is greater than the zero component 132, yet yields a FALSE value when the negative component 130 is not greater than the zero component 132. In some embodiments, the controller 98 may compare the negative component 130 to a lower limit cutoff value 134, which may be stored in a storage device 68 accessible by the controller 98. As illustrated in FIG. 4, a third comparison 137 of the negative component to the lower limit cutoff value 134 yields a TRUE value when the negative component is greater than the lower limit cutoff value 134, yet yields a FALSE value when the negative component is not greater than the lower limit cutoff value 134. The third comparison 137 may facilitate the reduction of false positive indications of a backspin event, or the third comparison 137 may facilitate the indication of backspin events that generate voltages on the cable 46 that exceed a predefined threshold voltage (e.g., 25, 50, or 100 V) that correspond to the lower limit cutoff value 134. Furthermore, in some embodiments, the controller 98 may receive a TRUE value for an ESP shutdown signal 136 when the ESP control system 36 is not providing power to the ESP assembly 22 via the cable 46. The controller 98 may receive a FALSE value for the ESP shutdown signal 136 when the ESP control system 36 is providing power to the ESP assembly 22 via the cable 46 (e.g., during operation of the motor 30 to pump a fluid from the well bore 12 to the surface).

The controller 98 determines whether a backspin event of the motor 30 is occurring upon evaluation of each of the factors, as shown in FIG. 4 by the AND gate 138. Accordingly, as illustrated in FIG. 4, the motor backspin event signal 140 from the AND gate 138 is a TRUE value (to indicate that a backspin event of the motor 30 is indeed occurring) when the ESP shutdown signal 136 is TRUE, the first comparison 133 is TRUE, the second comparison 135 is TRUE, and the third comparison 137 is TRUE. Although the AND gate 138 of FIG. 4 illustrates four inputs, it may be appreciated that in some embodiments the controller 98 may determine the motor backspin event signal 140 based on greater or lesser inputs. For example, the controller 98 may determine the motor backspin event signal 140 based on (a) only the first comparison 133, (b) only the second comparison 135, (c) the first comparison 133 and the second comparison 135, (d) the first comparison 133 and the ESP shutdown signal 136, or (e) the second comparison 135 and the ESP shutdown signal 136, among other combinations of one or more inputs discussed above.

In some embodiments, the controller 98 may execute the backspin detection algorithm 120 continuously, at periodic intervals, or on demand. For example, the controller 98 may execute the backspin detection algorithm 120 to detect a backspin event of the motor 30 continuously or at regular intervals (e.g., 5, 15, 60, 600, or 3600 seconds) while the ESP control system 36 is not supplying power to drive the motor 30 (e.g., during shutdown of the motor 30).

Figure 5:
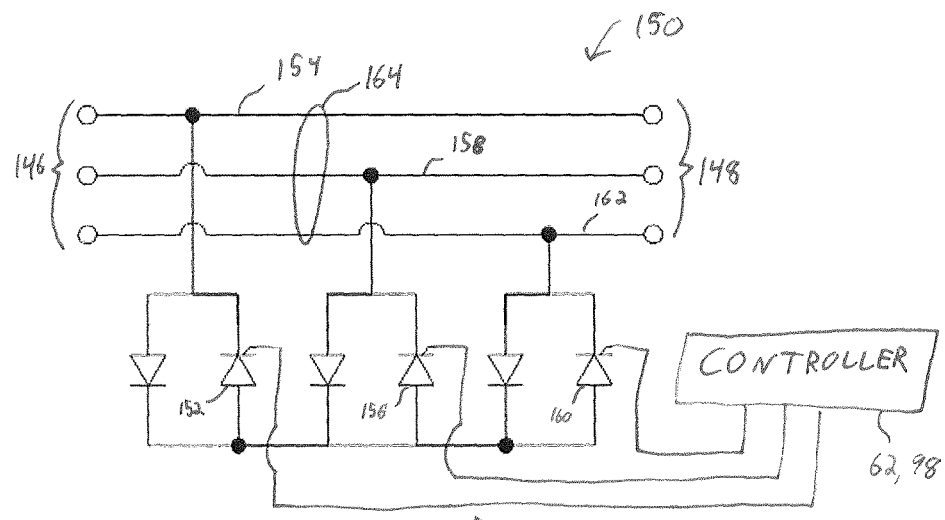
FIG. 5 is schematic of an embodiment of a crowbar circuit in accordance with aspects of the present disclosure.

Upon detection of the backspin event of the motor 30, the controller 62 or 98 may execute instructions to reduce or mitigate voltage on the cable 46, to alert personnel to the voltage on the cable 46, or to control restrictions on access to the cable 46 for the duration of the backspin event. In some embodiments, the controller 62 or 98 may reduce or mitigate the voltage on the cable 46 through the activation of a crowbar circuit 150, as illustrated in FIG. 5. The crowbar circuit 150 may be disposed within the ESP control system 36 on the high voltage side or the low voltage side of the transformer 42. For example, a first end 146 of the crowbar circuit 150 may be coupled to the high voltage side of the transformer 42, or a second end 148 of the crowbar circuit 150 may be coupled to the low voltage side of the transformer 42.

In some embodiments, as shown in FIG. 5, the variable frequency signal (e.g., voltage) is provided to the cable 46 via a three phase system. The crowbar circuit 150 may be a three-phase network on a power line 164 that the controller 62 or 98 may short together upon detection of the backspin event. The controller 62 or 98 may short the phases of the power line 164 together and/or short the power line to ground via control of one or more switches (e.g., thyristors, silicon controlled rectifiers (SCR). For example, the crowbar circuit 150 may include a first switch 152 (e.g., first SCR) coupled to a first line 154 of the power line 164, a second switch 156 (e.g., second SCR) coupled to a second line 158 of the power line 164, and a third switch 160 (e.g., third SCR) coupled to a third line 162 of the power line 164. Each of the first switch 152, the second switch 156, and the third switch 160 is coupled to the controller 62 or 98. Through activation of each switch 152, 156, 160, the controller 62 or 98 may drive the voltage on the power line 164 to be zero in the ESP control system 36 such that the voltage generated by the backspin event decreases along the cable 46. Thus, activation of the switches 152, 156, 160 of the crowbar circuit 150 may enable the controller 62 or 98 to maintain the voltage at the surface of the well bore 12 below a predefined threshold (e.g., less than 5, 10, 20, or 50 V). In some embodiments, the controller 62 or 98 may activate the crowbar circuit 150 whenever the ESP control system 36 does not supply the variable frequency voltage to drive the motor 30. For example, the controller 62 or 98 may activate the crowbar circuit 150 whenever the ESP control system 36 shuts down the ESP assembly 22.

Figure 6:
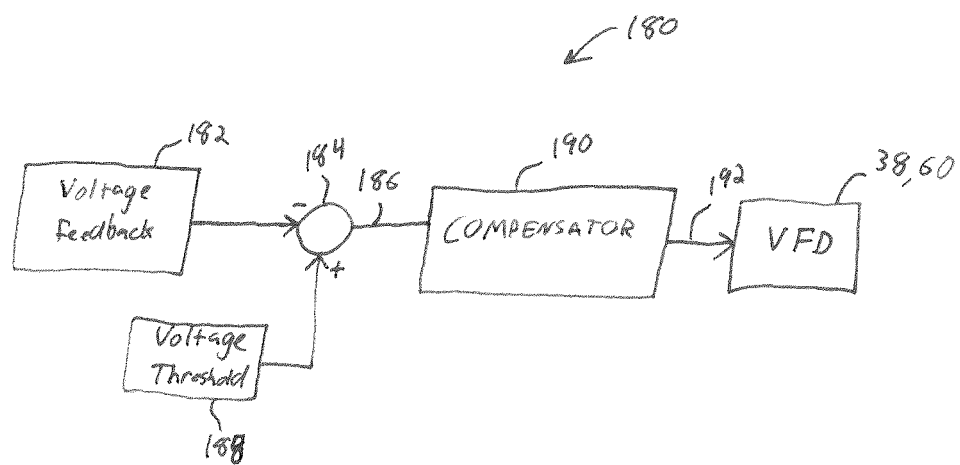
FIG. 6 is a block diagram of an embodiment of an algorithm to compensate a voltage in accordance with aspects of the present disclosure.

FIG. 6 illustrates an embodiment of a block diagram of an algorithm 180 that may be executed by the controller 62 of embodiments of the dual drive ESP control system 36. The controller 62 receives voltage feedback 182 from the one or more sensors 48 corresponding to the voltage on the cable 46 during a backspin event of the motor 30. The controller 62 determines (summing junction 184) a difference 186 between the voltage feedback 182 and a voltage threshold 188 that may be stored in the memory 66 or a storage device 68 accessible to the controller 62. The controller 62 utilizes one or more functions of a compensator 190 to determine instructions 192 for at least one of the primary VFD 48 and the secondary VFD 60 to adjust the voltage feedback 182. The compensator 190 may include, but is not limited to a PID controller, a PI controller, a PD controller, or a lag-lead controller. The instructions 192 may be instructions to actively reduce or to cancel out the measured voltage feedback 182 via a variable frequency signal (e.g., voltage) supplied by the primary VFD 38 and/or the secondary VFD 60. Accordingly, the controller 62 may execute the algorithm 180 as a closed-loop system to drive the voltage feedback 182 below the voltage threshold 188. That is, the controller 62 may execute the algorithm 180 to control a VFD (e.g., primary VFD 38, secondary VFD 60) to compensate for the measured voltage feedback on the cable 46 from the backspin event of the motor 30. In some embodiments, the voltage threshold 188 may be less than approximately 50, 25, 20, or 10 V.

In some embodiments of the dual drive ESP control system 36, the controller 62 may control a switch 194 (e.g., thyristor, SCR) of the dynamic brake circuit 88 (see FIG. 2) to dissipate the voltage generated by the backspin event of the motor 30. When the controller 62 closes the switch 194 to short the capacitor 82 of the secondary VFD 60, the secondary VFD 60 may dissipate the voltage on the cable 46. Moreover, the secondary VFD 60 may be utilized as a dynamic brake on the motor 30.

Figure 7:
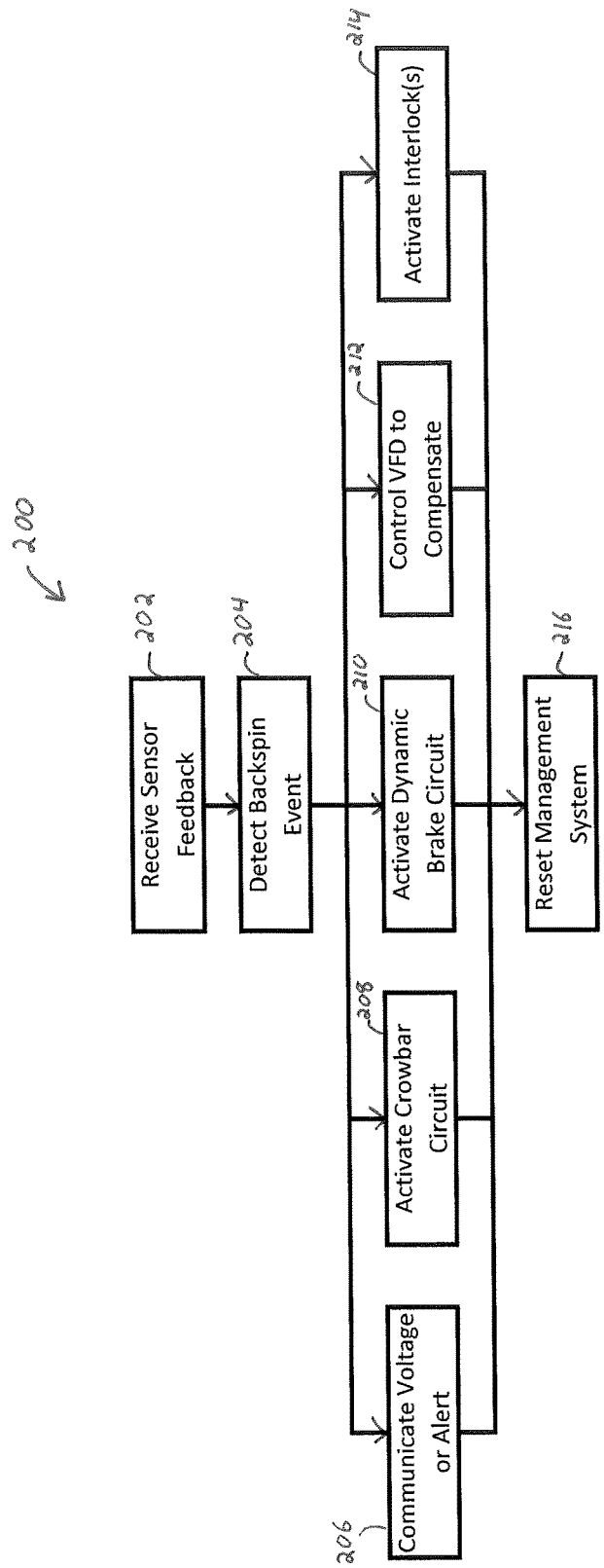
FIG. 7 is a flowchart of an embodiment of a method for detection and management of a backspin event in accordance with aspects of the present disclosure.

FIG. 7 is an embodiment of a method 200 for detection and management of a backspin event of the motor 30. As discussed above, a controller (e.g., controller 62 of the dual drive ESP control system 36, controller 98 of the virtual encoder ESP control system 36) receives (block 202) feedback from one or more sensors 48. The controller detects (block 204) a backspin event of the motor 30 of the ESP assembly 22, such as discussed above with the backspin detection algorithm 120 of FIG. 4. Upon detection of the backspin event, the controller may manage a response to the detected backspin in one or more manners. For example, the controller may communicate (block 206) a measured voltage on the cable 46 to personnel, such as personnel near the cable 46, an operator of the ESP assembly 22, a technician remote from the ESP control system 36, among others. In some embodiments, the controller communicates (block 206) the measured voltage visually (e.g., via one or more lights, via a display), audibly (e.g., via a speaker), or any combination thereof. In some embodiments, the controller 62 or 98 may communicate (block 206) the measured voltage when the measured voltage is greater than a threshold, such as 1, 5, or 10 V. Additionally, or in the alternative, the controller may communicate (block 206) an alert to personnel of the potential risk or instruct personnel to avoid interaction with the cable 46. It may be appreciated that the communication of the voltage on the cable 46 passively alerts personnel to a potential risk.

Moreover, the controller may manage a response to the detected backspin through the execution of instructions to actively reduce or eliminate risk caused by voltage on the cable 46. For example, the controller may activate (block 208) a crowbar circuit 150, as described above with FIG. 5. The crowbar circuit 150 may reduce or eliminate the voltage on the cable 46 by shorting one or more phases of the power line together, or shorting the power line to ground. Moreover, the controller may activate (block 210) the dynamic brake circuit 88, such as the dynamic brake circuit illustrated in FIG. 2. As discussed above, the dynamic brake circuit 88 may reduce the voltage on the cable 46 below a threshold. In some embodiments, the controller may actively control (block 212) a VFD (e.g., primary VFD 38, secondary VFD 60) to compensate for or to cancel the voltage on the cable 46. For example, the controller may execute instructions for the algorithm 180 discussed above with FIG. 6. In some embodiments, the controller may activate (block 214) one or more interlocks that may restrict or reduce access to the cable. These one or more interlocks may include preventing access to the internal components of the primary VFD 38, the transformer 42, the synchronization circuitry 44, a well junction box of the ESP control system 36, or any combination thereof. The one or more interlocks may include mechanical interlocks, electro-mechanical interlocks, or electronic interlocks. The controller may execute instructions for one or more of the response shown in blocks 206, 208, 210, 212, and 214 upon detection of the backspin event in block 204.

Upon detection that the backspin motor event has ended such that the voltage on the cable 46 is below a threshold, the controller may reset (block 216) the management system. For example, the controller may cease communication of the detected backspin event of the motor from block 206, the controller may disengage the crowbar circuit 150 from block 208, the controller may disengage the dynamic brake circuit from blocks 210, the controller may halt compensation of the voltage on the cable 46 from block 212, or the controller may disengage the interlocks from block 214 to enable access to the cable 46, or any combination thereof.

Technical effects of the disclosure include the detection of a backspin event of a permanent magnet motor and management of one or more methods to reduce or eliminate exposure to the voltage on the cable coupled to the motor. A controller that detects the backspin event of the motor may passively communicate the event and a voltage on the cable to personnel. In some embodiments, the controller may actively control one or more systems to reduce or eliminate the voltage on the cable. Additionally, the controller may restrict access to the cable for the duration of the backspin event of the motor. Through the detection and management of a response to a detected backspin event of a permanent magnet motor, the controller may reduce a shock risk for personnel at the surface of an ESP assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of controlling an electric motor assembly comprising:
   detecting a backspin event of an electric motor based at least in part on feedback from a sensor configured to measure a current or a voltage on a cable coupled to the electric motor, wherein detecting the backspin event of the electric motor comprises:
      generating a positive component of the feedback, a negative component of the feedback, and a zero component of the feedback;
      comparing the positive component to the negative component to determine a first factor; and
      comparing the negative component to the zero component to determine a second factor, wherein detection of the backspin event is based at least in part on the first factor and the second factor; and
   managing a response to the detected backspin event of the electric motor, wherein the response comprises:
      communicating an alert to personnel;
      controlling the voltage on the cable to be less than a voltage threshold; or
      any combination thereof.

2. The method of claim 1, wherein detecting the backspin event of the electric motor is based at least in part on a signal corresponding to whether power is provided to the electric motor.

3. The method of claim 1, wherein detecting the backspin event of the electric motor comprises comparing the negative component to a lower limit cutoff value to determine a third factor, wherein the detection of the backspin event is based at least in part on the first factor, the second factor, and the third factor.

4. The method of claim 1, wherein detecting the backspin event of the electric motor comprises comparing the current on the cable to a lower limit cutoff current value, comparing the voltage on the cable to a lower limit cutoff voltage value, or any combination thereof.

5. The method of claim 1, wherein the electric motor comprises a permanent magnet motor.

6. The method of claim 5, wherein the electric motor assembly comprises an electric submersible pump (ESP) assembly.

7. The method of claim 1, wherein communicating the alert to the personnel comprises visually communicating the voltage on the cable to the personnel.

8. The method of claim 1, wherein controlling the voltage on the cable to be less than the voltage threshold comprises activating a crowbar circuit or a dynamic brake circuit.

9. The method of claim 1, wherein controlling the voltage on the cable to be less than the voltage threshold comprises:
   determining instructions for transmission to a variable frequency drive (VFD) in a closed-loop system based at least in part on the feedback from the sensor, wherein the VFD is configured to supply a variable frequency voltage to drive the electric motor during operation of the electric motor assembly; and
   transmitting the instructions to the VFD, wherein the VFD is configured to supply a compensatory variable frequency voltage to the electric motor via the cable, wherein the compensatory variable frequency voltage is configured to drive the voltage on the cable below the voltage threshold.

10. The method of claim 1, wherein the response comprises activating one or more interlocks to restrict access to the cable for a duration of the detected backspin event.

11. An electric submersible pump (ESP) control system comprising:
   one or more sensors coupled to a cable, wherein the one or more sensors are configured to measure a voltage or a current of the cable, and the cable is configured to electrically couple the ESP control system to a permanent magnet motor;
   a primary variable frequency drive (VFD) configured to receive power from a power source and to output a variable frequency and variable amplitude AC signal;
   a transformer comprising a low voltage side and a high voltage side of the transformer, wherein the primary VFD is coupled to the low voltage side, and wherein the transformer is configured to receive the variable amplitude AC signal from the primary VFD and output a stepped up AC signal to the cable; and
   a controller coupled to the one or more sensors, wherein the controller is configured to:
      detect a backspin event of the permanent magnet motor based at least in part on the measured voltage or current of the cable; and
      manage a response to the detected backspin event, wherein the response comprises a communication to alert personnel, a first action to control the voltage on the cable to be less than a voltage threshold, a second action to restrict access to the cable, or any combination thereof.

12. The ESP control system of claim 11, wherein the controller is coupled to the primary VFD, and the first action comprises controlling the primary VFD to supply a compensatory variable frequency voltage to the permanent magnet motor via the cable, wherein the compensatory variable frequency voltage is configured to drive the voltage on the cable below the voltage threshold.

13. The ESP control system of claim 12, wherein the ESP control system comprises a secondary VFD coupled to the controller, wherein the secondary VFD is configured to directly adjust a phase angle of the stepped up AC signal, the first action comprises controlling the secondary VFD to supply a secondary compensatory variable frequency voltage to the permanent magnet motor via the cable, and the secondary compensatory variable frequency voltage is configured to drive the voltage on the cable below the voltage threshold.

14. The ESP control system of claim 11, wherein the ESP control system comprises:
   a secondary VFD coupled to the high voltage side of the transformer, wherein the secondary VFD is configured to supply a secondary variable frequency voltage to the cable, and the secondary VFD comprises a dynamic brake circuit, wherein the first action comprises activating the dynamic brake circuit to control the voltage on the cable to be less than a voltage threshold.

15. The ESP control system of claim 11, wherein the ESP control system comprises a crowbar circuit coupled to the controller, wherein first action comprises activating the crowbar circuit.

16. The ESP control system of claim 11, wherein the ESP control system comprises one or more interlocks, the second action comprises activating the one or more interlocks to restrict access to the cable, and the one or more interlocks comprise at least one of a mechanical interlock, an electro-mechanical interlock, or an electronic interlock.

17. The ESP control system of claim 11, comprising a display coupled to the controller, wherein the display is configured to display the measured voltage, the alert, or any combination thereof.

18. A non-transitory computer readable media comprising instructions to be executed by a processor of an electric submersible pump (ESP) control system, wherein the instructions comprise instructions to:
    detect a backspin event of an electric motor based at least in part on feedback from a sensor configured to measure a current or a voltage on a cable coupled to the electric motor, wherein the instructions to detect the backspin event comprise instructions to:
        generate a positive component of the feedback, a negative component of the feedback, and a zero component of the feedback;
        compare the positive component to the negative component to determine a first factor; and
        compare the negative component to the zero component to determine a second factor, wherein detection of the backspin event is based at least in part on the first factor and the second factor; and
    manage a response to the detected backspin event of the electric motor, wherein the response comprises:
        communicating an alert to personnel;
        controlling the voltage on the cable to be less than a voltage threshold; or
        any combination thereof.

19. The non-transitory computer readable media of claim 18, wherein controlling the voltage on the cable to be less than a voltage threshold comprises activating a crowbar circuit or a dynamic brake circuit.

20. The non-transitory computer readable media of claim 18, wherein controlling the voltage on the cable to be less than a voltage threshold comprises instructions to:
    determine signals for transmission to a variable frequency drive (VFD) in a closed-loop system based at least in part on the feedback from the sensor, wherein the VFD is configured to supply a variable frequency voltage to drive the electric motor during operation of the ESP assembly; and
    transmit the signals to the VFD, wherein the VFD is configured to supply a compensatory variable frequency voltage to the electric via the cable, wherein the compensatory variable frequency voltage is configured to drive the voltage on the cable below the voltage threshold.

* * * * *